3,560,612
METHOD OF ALLEVIATING HYPERCITRICEMIA
Toshiharu Matsumura, Nara, and Akira Tsunemitsu, Osaka, Japan, assignors to Takeda Chemical Industries, Ltd., Osaka, Japan
No Drawing. Application Jan. 16, 1969, Ser. No. 797,333, which is a continuation of application Ser. No. 583,418, Sept. 30, 1966. Divided and this application Oct. 10, 1969, Ser. No. 870,917
Claims priority, application Japan, Sept. 30, 1965, 40/60,094
Int. Cl. A61k *19/00*
U.S. Cl. 424—94                                              6 Claims

ABSTRACT OF THE DISCLOSURE

This invention relates to the administration of ubiquinone 35 (coenzyme Q7) for lowering blood citrate level in patients.

---

This is a divisional application of Ser. No. 797,333, filed Jan. 16, 1969 which in turn is a continuation application of Ser. No. 583,418, filed Sept. 30, 1966, now abandoned.

This invention relates to a method of alleviating hypercitricemia which comprises administering ubiquinone of the formula

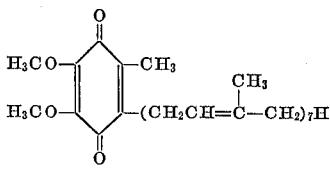

to a sufferer from the disease. Hereinafter in this specification ubiquinone is also referred to as "ubiquinone $5n$" wherein $n$ is the number of units in the isoprene chain. Ubiquinone $5n$ is also designable as Coenzyme Q$n$.

The inventors have clearly demonstrated in many patients with severe destructive periodontal disease that (1) the citric acid content in blood is apparently elevated, (2) the amount of citric acid excreted in urine during two hours after intravenous administration of sodium citrate is significantly increased and (3) disturbed metabolism of citric acid exists.

In an animal test in which hypercitricemia was produced by injecting $\alpha,\alpha'$-dipyridyl or desoxycorticosterone (DOC) into mildly scorbutic guinea pigs, the inventors have demonstrated destructive periodontal lesions resembling severe scorbutic degeneration which is considered to be an important figure as regards the development and progress of severe destructive periodontal disease. Based on these investigations, it is evident that the metabolism of periodontal tissues is depressed under the condition of hypercitricemia.

The inventors have newly found that the systemic administration of ubiquinone restores hypercitricemia normal level and this medication is dramatically effective in some cases with hypercitricemia nonresponsive to vitamin C.

The principal object of this invention is to provide a method of alleviating hypercitricemia, and this object is realized by administering ubiquinone to a sufferer from the disease.

Ubiquinone is also sometimes designated coenzyme Q and is one of the coenzymes which is present in animal and plant organs, and in microorganisms such as yeast, especially in the mitochondria of the cells and comprises such multiple homologues as ubiquinone 5, ubiquinone 10, ubiquinone 15, . . . ubiquinone 35, ubiquinone 40, ubiquinone 45, ubiquinone 50, etc., according to the number of units in the isoprene chain. Therefore, ubiquinone $5n$ can be isolated from the above-mentioned sources. Ubiquinone $5n$ can also be prepared advantageously by utilizing the process described in Japanese Patent Publication Nos. 1,877/1955 and 10,169/1957.

The acute toxicity of ubiquinone 35 is $LD_{50}=4000$ milligrams per kilogram when administered intraperitoneally to mice. Toxic manifestations were not observed with daily intraperitoneal injection of 10, 20 and 50 milligrams per kilogram, respectively, in rats for 30 days and no changes were observed histologically in the pituitary, thyroid, thymus, heart, lungs, liver, adrenals, spleen, kidneys or testes.

The dose of ubiquinone in the method of this invention varies depending upon the blood citrate levels and administration method. However, the daily dose for an adult is generally about 5 to 1,500 milligrams per day in both oral and parenteral administration. The optimal dose of ubiquinone 35 for an adult is orally about 15 to about 30 milligrams per day and is about 10 to about 20 milligrams per day by injection. For instance, when a patient, whose blood citrate level is about 2-fold the normal level, is orally administered with ubiquinone 35 at a daily dose of 15 to 30 milligrams for 7 to 14 days or intravenously administered with ubiquinone 35 at a daily dose of 10 to 20 milligrams for 5 to 10 days, the administration restores the hypercitricemia to normal level, paralleled by alleviation of any attendant gingival symptoms, and can improve the response to local treatment.

According to the method of this invention, ubiquinone can be administered as it is or in a composition consisting of the ubiquinone and a pharmaceutically acceptable liquid or solid carrier which is not incompatible with ubiquinone. The composition can take the form of tablets, powder, granule, capsules, injection or suspension. The solid carrier, which may be admixed with ubiquinone, can be, for example, cornstarch lactose, talc, stearic acid, magnesium stearate, gums, or the like. The liquid carrier for injection or suspension can be, for example, water, vegetable oils, detergents, surface active agents, etc.

The following illustrative examples of preparations containing ubiquinone as an active ingredient are given:

(1) A capsule containing 5.0 milligrams of ubiquinone 35 and 77.0 milligrams of granular lactose.

(2) A capsule containing 20.0 milligrams of ubiquinone 35 and 230.0 milligrams of granular lactose.

(3) A capsule containing 20.0 milligrams of ubiquinone 35 and 230.0 milligrams of granular lactose.

(4) An injection composition containing 10 milligrams of ubiquinone 35, 100 milligrams of surface active agent (ethylene oxide adduct of hydrogenated castor oil), 10 milligrams of benzyl alcohol, 9 milligrams of sodium chloride, and distilled water in an amount to make the whole amount 1 milliliter.

(5) Vial injection composition containing 100 milligrams of ubiquinone 35, 1,000 milligrams of surface active agent (ethylene oxide adduct of hydrogenated castor oil), 100 milligrams of benzyl alcohol, 90 milligrams of sodium chloride, and distilled water in an amount to make the whole amount 10 milliliters.

The test cases exhibiting the characterization of this invention are as follows. In the following test cases, the abbreviations "mg." and "dl." refer to "milligram(s)" and "deciliter," respectively.

TEST CASES

(1) Medicine used

Ubiquinone 35

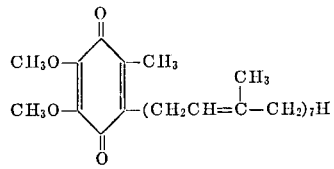

(2) Subjects

The normal range of blood citrate content for 60 cases was 1.0–2.5 mg./dl.

Only those 10 individuals who presented clinical and radiographic signs of severe destructive periodontal disease without much apparent deposition of calculus and whose fasting blood citrate levels were above 2.5 mg./dl. were selected for assay. They had a nearly normal occlusion and their gingival symptoms were not improved by simple repeated mouth washing with Rivanol (2-ethoxy-6,9-diamino-acridinium hydrochloride) solution.

(3) Administration and dosage

Usually the daily dose is 10 to 20 mg. intravenously every day, for 5 to 10 days or every two days, 5 to 10 times. The daily dose of 15 to 30 mg. is administered orally every day for 7 to 14 days. Ubiquinone is used appropriately in the formulations 1 and 2 (oral) and 5 (intravenous).

(4) Clinical observations

The therapeutic effect of ubiquinone was evaluated on the restoration of both the blood citrate level and subjective symptoms in the patients who received no local treatment except for mouth washing in Rivanol solution. This investigation was carried out during the months of May to August.

(5) Determination of blood citrate

The citric acid in the blood was determined by the method of Ettinger, Goldbaum and Smith (Journal of Biological Chemistry, vol. 199, 531–536 (1952)).

(6) Results

Table 1 summarizes clinical results. The restoration of blood citrate level was judged as "effective" on those subjects who showed a reduction of more than 1.2 mg./dl. because the daily variations of same individuals were within ±0.6 mg./dl. Four of the five cases responded to ubiquinone in both the injected group and the capsule-treated group. In the effective cases, most patients reported improvement of subjective gingival symptoms such as the arrest of gingival bleeding upon brushing, disappearance of itchy feeling and alleviation of gnawing dull pain accompanied with systemic improvement of fatigue and loss of appetite. Cases 5, 8, 9 who had never responded to the administration of vitamin C showed a dramatic response to ubiquinone. No side effect of this drug was observed.

TABLE 1.—EFFECT OF CLINICAL ADMINISTRATION OF UBIQUINONE 35 ON HYPERCITRICEMIA IN PATIENTS WITH SEVERE PERIODONTAL DISEASE

| No. of cases | Name of patient | Age | Sex | Blood citrate mg./dl. Before | Blood citrate mg./dl. After | Administration | Dose, mg./day | Period, days |
|---|---|---|---|---|---|---|---|---|
| 1 | T.M. | 20 | ♀ | 3.3 | 1.9 | Injection | 10 | 10 |
| 2 | S.Y. | 24 | ♂ | 3.4 | 2.0 | do | 10 | 5 |
| 3 | Y.B. | 35 | ♀ | 3.4 | 2.2 | do | 10 | 10 |
| 4 | Y.K. | 27 | ♂ | 2.7 | 2.0 | do | 10 | 5 |
| 5 | A.T. | 22 | ♀ | 3.2 | 1.6 | do | 20 | 7 |
| 6 | T.K. | 26 | ♀ | 3.7 | 1.9 | Capsule | 15 | 7 |
| 7 | F.T. | 28 | ♀ | 2.9 | 2.3 | do | 15 | 7 |
| 8 | S.M. | 22 | ♂ | 5.0 | 2.0 | do | 30 | 7 |
| 9 | S.S. | 31 | ♂ | 5.4 | 3.5 | do | 30 | 14 |
| 10 | H.K. | 33 | ♀ | 3.7 | 2.1 | do | 30 | 10 |

| No. of cases | Effectiveness [1] | Gingival subjective symptoms Before Bleeding | Gingival subjective symptoms Before Itchy feeling | Gingival subjective symptoms Before Gnawing pain | Gingival subjective symptoms After Bleeding | Gingival subjective symptoms After Itchy feeling | Gingival subjective symptoms After Gnawing pain | Systemic subjective symptoms Fatigue, loss of appetite Before | Systemic subjective symptoms Fatigue, loss of appetite After |
|---|---|---|---|---|---|---|---|---|---|
| 1 | Effective | − | + | + | − | + | − | ++ | − |
| 2 | do | + | + | + | + | − | − | + | − |
| 3 | do | + | − | + | − | + | + | + | − |
| 4 | Noneffective | ++ | + | + | + | ++ | + | + | + |
| 5 | Effective | + | ++ | ++ | + | − | − | + | − |
| 6 | do | − | ++ | ++ | − | − | − | ++ | − |
| 7 | Noneffective | + | + | + | + | + | + | + | + |
| 8 | Effective | − | + | + | − | − | − | + | − |
| 9 | do | + | ++ | ++ | − | − | − | ++ | + |
| 10 | do | − | + | + | − | − | + | ++ | − |

[1] Restoration of blood citrate.

NOTE: Intensity of subjective symptoms: −<+ <++
Cases 5, 8, 9 did not respond to vitamin C.

What we claim is:

1. The method of restoring to normal the blood citrate level in a human patient suffering from hypercitricemia which comprises administering to said patient an antihypercitricemia effective amount of ubiquinone of the formula

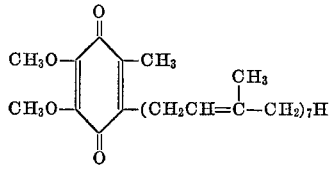

2. A method as claimed in claim 1 wherein a daily dose for an adult of the administration of ubiquinone is orally about 5 milligrams to about 1,500 milligrams.

3. A method as claimed in claim 2 wherein the daily dose is about 15 milligrams to about 30 milligrams.

4. A method as claimed in claim 1 wherein a daily dose for an adult of the administration of ubiquinone is about 5 milligrams to about 1,500 milligrams by injection.

5. A method as claimed in claim 4 wherein the daily dose is about 10 milligrams to about 20 milligrams by injection.

6. The method of alleviating hypercitricemia which is nonrespnsive to treatment with vitamin C, which comprises administering to a human patient suffering from such hypercitricemia an antihypercitricemia effective amount of ubiquinone of the formula

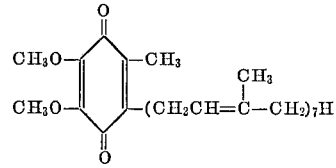

References Cited

UNITED STATES PATENTS 3,426,125  2/1969  Shigeta et al. _____ 424—94

JEROME D. GOLDBERG, Primary Examiner